(No Model.)

F. T. STEVENS.
STEAM BOILER.

No. 480,880. Patented Aug. 16, 1892.

Witnesses:
Arthur C. Rider
C. J. Stevens

Inventor:
Fred. T. Stevens

United States Patent Office.

FRED T. STEVENS, OF BRYANT'S POND, MAINE.

STEAM-BOILER.

SPECIFICATION forming part of Letters Patent No. 480,880, dated August 16, 1892.

Application filed April 9, 1892. Serial No. 428,456. (No model.)

*To all whom it may concern:*

Be it known that I, FRED T. STEVENS, a citizen of the United States, residing at Bryant's Pond, in the county of Oxford and State of Maine, have invented certain new and useful Improvements in Steam-Boilers; and I do hereby declare the following to be a full, clear, and exact description of the invention, such as will enable others skilled in the art to which it appertains to make and use the same.

My invention relates to an improvement in steam-boilers, the object of which is to bring an inclosed small quantity of hot water in contact with the hottest part of the fire, converting this into steam, and keeping this space continually supplied with heated water. This I accomplish by constructing my boiler with an inner shell inclosing the tubes, an outer shell surrounding said inner shell, the center of said inner shell being preferably below that of the outer shell, so that a space will be formed between the two shells smaller at the bottom than at the top. This space is supplied by heated water from the inner shell passing through openings in the inner shell, preferably above the tube-level.

My invention is illustrated in the accompanying drawings, in which—

Figure 1:
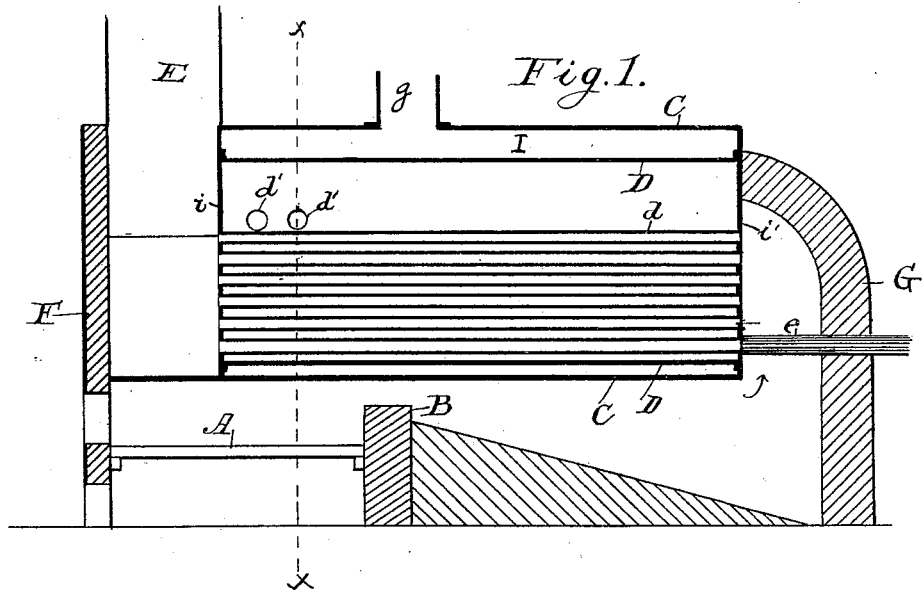
Figure 2:
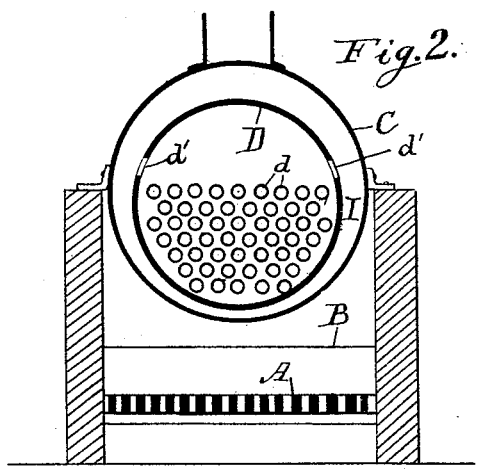

Figure 1 is a central longitudinal section, and Fig. 2 is a section on the line *x x* of Fig. 1.

A represents the grate, B the bridge-wall, F the front wall, G the rear wall, *g* the steam-dome, and E the chimney-flue, of any ordinary horizontal tubular boiler.

*i* is the front tube-shell, and *i'* the back tube-shell, *d* being the tubes. Instead of a single shell, as in ordinary boilers, I use two shells C and D, one inside of the other. I prefer to construct them, as here shown, with common tube-shells at either end. The inner shell D incloses and surrounds the tubes, and the feed-pipe *e* opens into it at the back end near the bottom. The outer shell C is placed, preferably, out of center with the inner shell, the center of the outer shell being the higher, so that the space I between the two shells will be smaller at the bottom than at the top, the object being to make the layer of water at the bottom as thin as possible, so that it will be the more quickly heated, and to make the steam-space at the top as large as possible. Openings $d'$ $d'$ are provided in the inner shell, by which the water flows from the space within the inner shell to the space between the two shells. These openings I prefer to place forward and above the tube-level, so that the tubes will always be covered.

In operation the feed-water will enter the inner shell at the rear and pass upward through the tubes, overflowing at its hottest point through the openings $d'$ $d'$ into the space between the two shells. Any sediment brought with the water will be deposited in the bottom of the inner shell and will not be brought in contact with the fire, as is the case in ordinary boilers. A comparatively thin layer of very hot water contained in the lower part of the space I will thus be brought into contact with the hottest part of the fire and converted into steam, which rises along the sides and collects in the upper part of the space I. The fact that a small amount of water confined in a narrow space and highly heated comes in contact with the fire enables steam to be generated by less fire and at an expenditure of less heat. The combustion will not be impeded by the cooling of the flame coming in contact with the cold water of the bottom of the boiler, as is usually the case, and the hot and burning gases will continue to the rear of the boiler and enter the tubes, where the efficiency of the fire is much more than it is at the bottom of the boiler. The heating-power of the flame is thus increased, a smaller fire is needed to run a large boiler, less fuel is used, and steam can be more quickly generated on starting the boiler, because the whole mass of water does not have to be heated to boiling-point before steam begins to be generated. If desired, the upper part of the shell D may be cut away, making more steam-space; but I prefer to have two complete shells, as described.

I claim—

1. In a tubular steam-boiler, an inner shell inclosing the tubes, an outer shell surrounding said inner shell, said inner shell having an opening for the flow of water from within to the space between the shells, substantially as described.

2. In a tubular steam-boiler, an inner shell inclosing the tubes, an outer shell surrounding said inner shell, the center of said inner shell being below that of the outer shell, the said inner shell having one or more openings through its walls, substantially as described.

3. In a tubular steam-boiler, an inner shell inclosing the tubes, an outer shell surrounding said inner shell, the said inner shell having one or more openings immediately above the tube-level, substantially as described.

In testimony whereof I affix my signature in presence of two witnesses.

FRED T. STEVENS.

Witnesses:
    ARTHUR C. RICKER,
    ALDEN CHASE.